United States Patent
Bonney et al.

(10) Patent No.: US 8,162,752 B2
(45) Date of Patent: Apr. 24, 2012

(54) VIRTUAL RADIO IN A WAGERING GAME MACHINE

(75) Inventors: James Bonney, Chicago, IL (US); Michael P. Connelly, Elmwood Park, IL (US); Eric M. Pryzby, Skokie, IL (US)

(73) Assignee: WMS Gaming Inc., Waukegan, IL (US)

( * ) Notice: Subject to any disclaimer, the term of this patent is extended or adjusted under 35 U.S.C. 154(b) by 999 days.

(21) Appl. No.: 11/575,611

(22) PCT Filed: Sep. 15, 2005

(86) PCT No.: PCT/US2005/032832
§ 371 (c)(1),
(2), (4) Date: Nov. 9, 2007

(87) PCT Pub. No.: WO2006/033941
PCT Pub. Date: Mar. 30, 2006

(65) Prior Publication Data
US 2008/0188291 A1 Aug. 7, 2008

Related U.S. Application Data

(60) Provisional application No. 60/611,474, filed on Sep. 20, 2004.

(51) Int. Cl.
*A63F 9/24* (2006.01)

(52) U.S. Cl. ............... 463/35; 463/25; 463/16; 463/39; 704/275

(58) Field of Classification Search .............. 463/25, 463/16, 35, 39; 345/158; 725/19; 370/337; 704/275
See application file for complete search history.

(56) References Cited

U.S. PATENT DOCUMENTS

| | | | |
|---|---|---|---|
| 5,978,488 A | 11/1999 | Margolin | |
| 6,328,649 B1 | 12/2001 | Randall et al. | |
| 6,561,908 B1 * | 5/2003 | Hoke | 463/35 |
| 6,657,116 B1 | 12/2003 | Gunnerson | |
| 6,846,238 B2 * | 1/2005 | Wells | 463/39 |
| 2002/0054020 A1 * | 5/2002 | Perkes | 345/158 |
| 2003/0007464 A1 * | 1/2003 | Balani | 370/310 |
| 2003/0043769 A1 * | 3/2003 | Dolman et al. | 370/337 |
| 2003/0060258 A1 * | 3/2003 | Coleman et al. | 463/16 |
| 2003/0064805 A1 * | 4/2003 | Wells | 463/39 |
| 2003/0167174 A1 * | 9/2003 | Dagtas et al. | 704/275 |
| 2003/0176218 A1 * | 9/2003 | LeMay et al. | 463/25 |
| 2004/0082388 A1 | 4/2004 | Simsek et al. | |
| 2005/0054441 A1 * | 3/2005 | Landrum et al. | 463/35 |
| 2005/0113173 A1 * | 5/2005 | Waters | 463/43 |
| 2010/0287579 A1 * | 11/2010 | Petrovic et al. | 725/9 |

OTHER PUBLICATIONS

"International Search Report for Application No. PCT/US2005/032832, date mailed Feb. 8, 2006", 4 pgs.

"Written Opinion of the International Searching Authority for Application No. PCT/US2005/032832, date mailed Feb. 8, 2006", 4 pgs.

* cited by examiner

*Primary Examiner* — Masud Ahmed
(74) *Attorney, Agent, or Firm* — Schwegman, Lundberg & Woessner, P.A.

(57) ABSTRACT

The present invention provides in one embodiment a computerized wagering game system has a gaming module comprising a processor and gaming code which is operable when executed on the processor to conduct a wagering game on which monetary value can be wagered. A virtual radio audio module is operable to play one of a plurality of audio programs selected by a wagering game player. The selected audio program is presented to simulate a radio such that playing of the selected audio program may start from a point other than the beginning of the audio track.

25 Claims, 3 Drawing Sheets

VIRTUAL RADIO IN A WAGERING GAME MACHINE

Related Application

This application is a U.S. National Stage Filing under 35 U.S.C. 371 from International Patent Application Ser. No. PCT/US2005/032832, filed 15 Sept. 2005, and published on Mar. 30, 2006 as WO 2006/033941 A1, which claims the priority benefit of U.S. Provisional application Ser. No. 60/611,474, filed 20 Sept. 2004, the contents of which are incorporated herein by reference.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD OF THE INVENTION

The invention relates generally to wagering gaming systems, and more specifically to a virtual radio system in a wagering game machine.

BACKGROUND OF THE INVENTION

A wide variety of gaming devices are now available to gamers and to casino operators in computerized form, from slot machines to games that are traditionally played live such as poker and blackjack. These computerized games provide many benefits to the game owner and to the gambler, including greater reliability than can be achieved with a mechanical game or human dealer, more variety, sound, and animation in presentation of a game, and a lower overall cost of production and management.

Computerized video game systems must be designed with many of the same concerns as their mechanical and table game ancestors—they must be fair, they must provide sufficient feedback to the gamer to make the game fun to play, and they must meet a variety of gaming regulations to ensure that both the machine owner and gamer are honest and fairly treated in implementing the game. Further, they must provide a gaming experience that is at least as attractive as the older mechanical gaming machine experience to the gamer, to ensure success in a competitive gaming market.

Many computerized wagering game systems have a variety of sound and graphical elements designed to attract and keep a game player's attention, such as sound effects, music, and animation. These game presentation features are often associated with a particular wagering game theme, such as a fishing theme or a Monopoly (TM Parker Brothers)-themed game.

Audio in wagering game machines such as slot machines has progressed from the early days of simple mechanical bells to sophisticated electronic sound effects and prerecorded music, adding to the richness of the gaming experience. Sound effects augment various game events, such as credit bang-up, reel spin on a slot machine, and winning a jackpot. Further, music is often played during game play to further entertain the game player, while different music is played when no players are currently using the game and the machine is in an attract mode.

But, even the music and sound effects presented in modern systems quickly become familiar to avid game players, and may not suit the tastes of some game players. While such players can simply move on to a different wagering game machine, it is desirable to keep wagering game players entertained and playing as long as possible, and wanting to come back to play again.

It is therefore desired to provide the game player with audio that is not repetitive and fatiguing, and that suits the game player's individual tastes.

SUMMARY OF THE INVENTION

The present invention provides in one embodiment a computerized wagering game system has a gaming module comprising a processor and gaming code which is operable when executed on the processor to play a wagering game on which monetary value can be wagered. A virtual radio audio module is operable to play one of a plurality of audio programs selected by a wagering game player. The selected audio program is presented to simulate a radio such that playing of the selected audio program may start from a point other than the beginning of the audio track.

DETAILED DESCRIPTION

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

The present invention provides in one embodiment a computerized wagering game system has a gaming module comprising a processor and gaming code which is operable when executed on the processor to play a wagering game on which monetary value can be wagered. A virtual radio audio module is operable to play one of a plurality of audio programs selected by a wagering game player. The selected audio program is presented to simulate a radio such that playing of the selected audio program may start from a point other than the beginning of the audio track.

Figure 1:
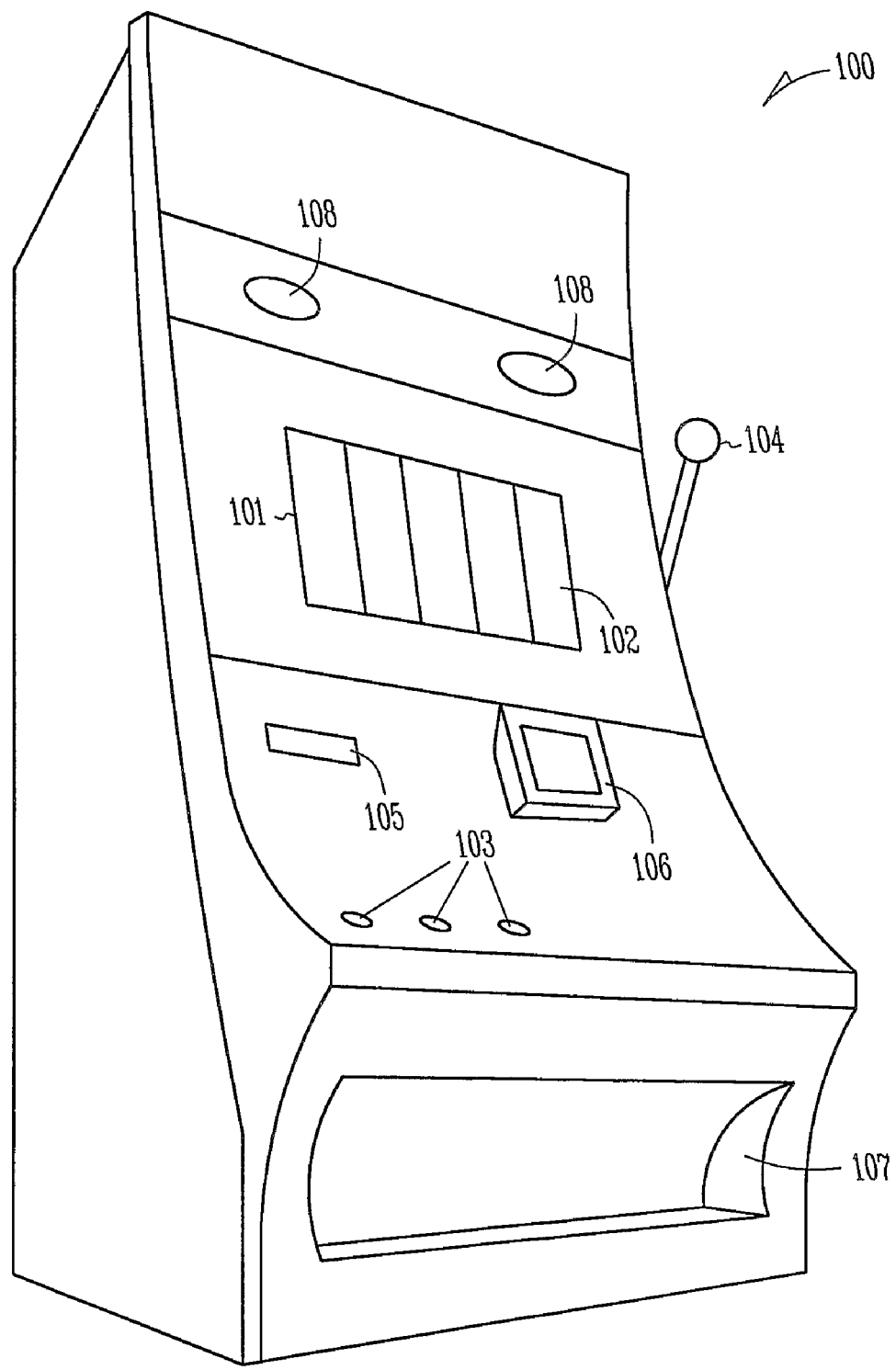
FIG. 1 shows a computerized reel slot gaming system having a virtual radio, consistent with an example embodiment of the present invention.

FIG. 1 illustrates a computerized wagering game machine, as may be used in an embodiment of the present invention. The computerized gaming system shown generally at 100 is a video gaming system, which displays information for at least one wagering game upon which monetary value can be wagered on video display 101. Alternate embodiments of the invention will have other game indicators, such as mechanical reels instead of the video graphics reels 102. The game of chance is played and controlled with various buttons 103, and in some embodiments also with a pull arm 104 to initiate reel spin. Value is wagered on the games, such as with tokens, coins, bills, or cards that hold value. The wagered value is conveyed to the machine through a changer 105 or a secure user identification module interface 106, and winnings are returned via the returned value card or through the coin tray 107. Sound is also provided through speakers 108.

Figure 2:
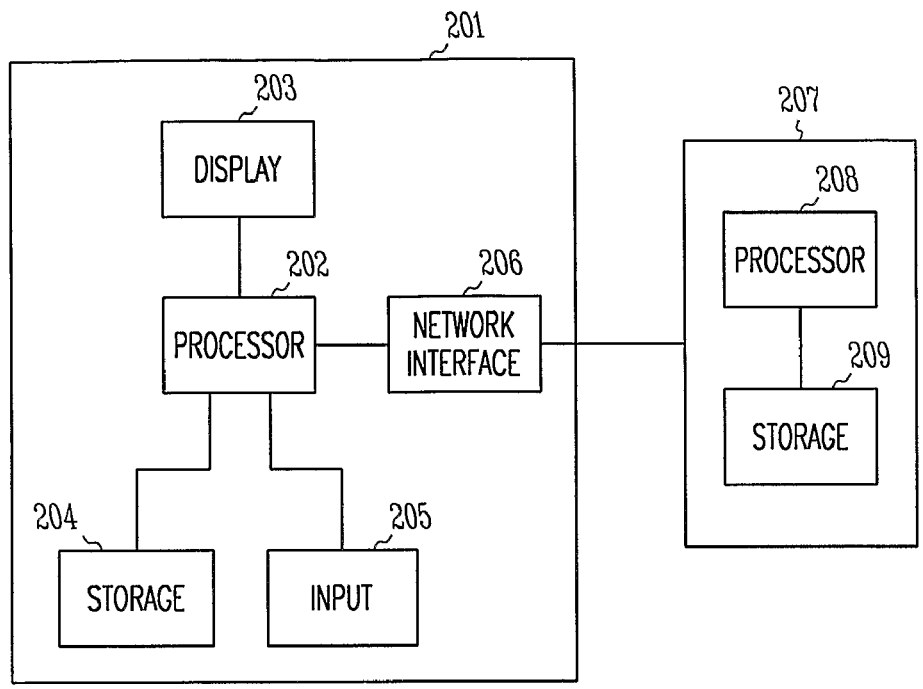
FIG. 2 is a block diagram of a computerized wagering game having a virtual radio, consistent with an example embodiment of the present invention.

FIG. 2 shows a block diagram of an example computerized wagering game system as may be used to practice some examples. A wagering game system 201, such as a video slot machine, a video poker machine, or other such wagering game, has a processor 202 and a video display 203 upon which data is graphically presented to game players. Storage 204 is used to store programs, multimedia files, and other such data. Input 205 is in various examples a touchscreen overlaying the display 203, buttons such as buttons 103, or other such device allowing a game player to provide input to the computerized wagering game system.

A network interface 206 provides a connection between the computerized wagering game system 201 and a network server 207. The network server also has a processor 208 and storage 209, which can be used to store data such as multimedia files.

In operation, gaming code runs on the processor 202, loaded from storage 204 or provided via the network connection 206. In some examples, the storage 204 from which the game code is loaded is a nonvolatile memory, such as an encrypted compact flash card device designed to preserve the integrity of the game program code. The game is presented on the display 203, and the user controls the game and provides input via input 205, such as a touchscreen or buttons. The computerized wagering game system's program code further includes a virtual radio audio module operable to play one of a plurality of audio programs selected by a wagering game player. The selected audio program is presented to simulate a radio, such that playing of the selected audio program may start from a point other than the beginning of the audio track.

In one embodiment, this is achieved by constantly running a multi-track audio program where different tracks contain different programs, and allowing the game player to select which program to listen to while using the wagering game machine. The tracks in the multi-track audio program not a part of the selected program are then muted, so only a single audio program is presented to the game player. In other embodiments, only a single program is playing at a time, but the start point of the audio track is selected randomly or at a point other than the beginning of the program to provide the illusion of tuning in to a radio station that is playing program material continuously.

The wagering game apparatus 201 in some embodiments further comprises a network interface 206, which may be used to couple the wagering game system to a server 207 having its own processor 208 and storage 209. In some embodiments, the server 207 provides the audio program information to the wagering game system 201 via the network interface 206, either in real-time or near real-time, or as an updated file containing new audio program data to be stored and played back later. The audio program material will therefore come from a variety of sources in various embodiments, including storage 204 within the gaming machine, streaming data received via the network interface 206, and a server's hard disk storage 209.

Figure 3:
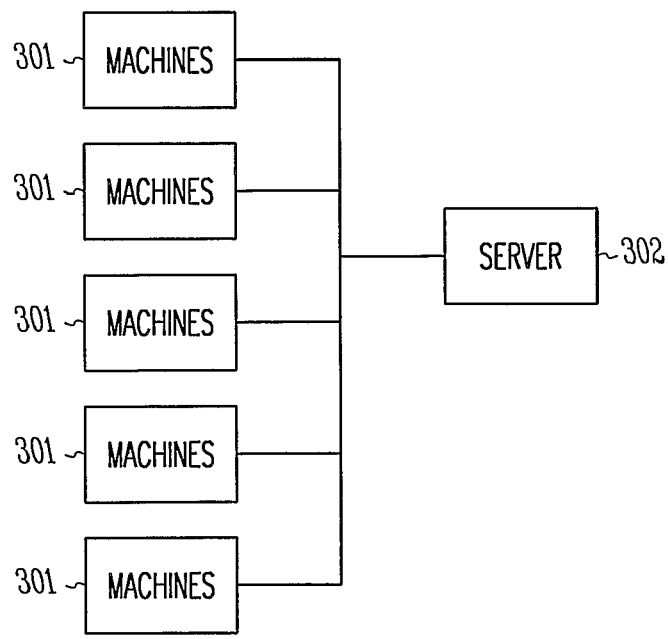
FIG. 3 is a block diagram of a virtual radio server and wagering game machine system, consistent with an example embodiment of the present invention.

A further example of a system incorporating a server is shown in FIG. 3, which shows an example in which multiple wagering game systems 301 are coupled to a server 302. In one embodiment, the audio program data streams from the server 302 to each of the multiple wagering game systems 301 in real-time or in near real-time. The audio programs presented can therefore be synchronized between wagering game machines 301 in some such embodiments, so that if two or more of the wagering game systems have selected the same audio program they will play the same audio at the same point, just as if two or more radios were tuned to the same radio station.

In an alternate embodiment, the audio programs available to the wagering game systems 301 are not synchronized, such that if two or more game players select the same audio program, genre, or virtual radio station, they will not necessarily be playing the same song or be at the same point in a particular song within the selected audio program.

Figure 4:
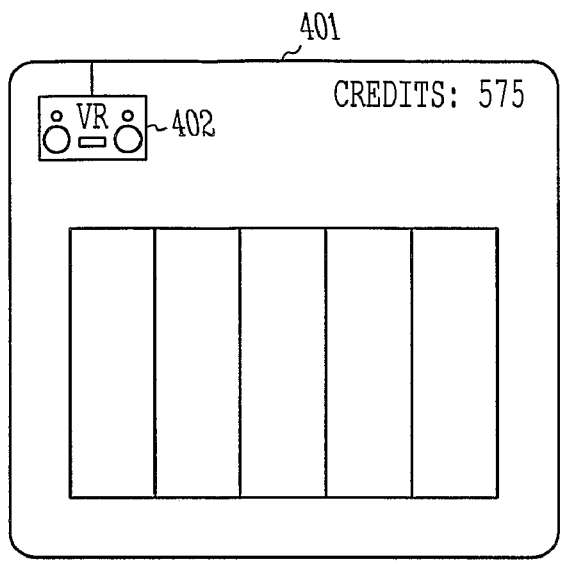
FIG. 4 is a screen shot of a computerized reel slot gaming system having a virtual radio, consistent with an example embodiment of the present invention.

The audio programs are selected in some examples via a user interface presented on the video display 101 of the wagering game system. FIG. 4 shows an example of a slot machine wagering game display 401 with a virtual radio icon 402. Selecting the virtual radio icon by touching the icon's location on the touchscreen display brings up the virtual radio programs screen of FIG. 5, on which the game player can select a preferred virtual radio program.

Figure 5:
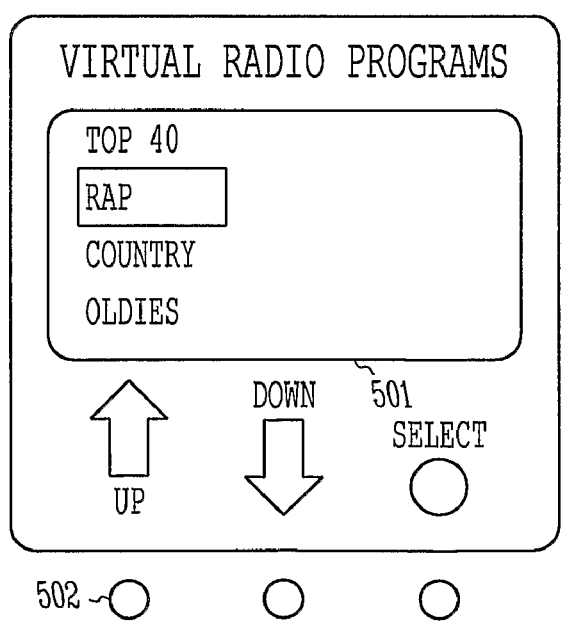
FIG. 5 is a screen shot of a virtual radio program selection screen on a computerized wagering game system, consistent with an example embodiment of the present invention.

FIG. 5 shows at 501 a listing of the virtual radio programs available. The game player selects a program, such as by touching the desired program name on the touchscreen display, or by using buttons 502 corresponding to various icons presented on the video display, such as the up, down, and select icons shown in the display image.

These examples of a virtual radio in a wagering game machine illustrate various ways in which a wagering game can play back audio tracks to emulate a radio. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

The invention claimed is:

1. A computerized wagering game system, comprising:
 a gaming module comprising a processor and gaming code configured to play a wagering game on which monetary value can be wagered;
 a virtual radio audio module configured to play a selected multiple audio track program of constantly running multi-track audio programs, wherein different audio tracks include different audio programs; and
 the virtual radio audio module configured to play the selected audio track program, wherein the selected audio track program is selected by a wagering game player;
 and the virtual radio audio module configured to mute audio tracks of the audio programs not part of the selected audio program, the selected audio program presented to simulate a radio such that playing of the selected audio program may start from a point other than the beginning of an audio track corresponding to the selected audio program, wherein the audio programs are received from a server via a network connection.

2. The computerized wagering game system of claim 1, wherein the audio track is played by starting the audio track from a random point in the audio track.

3. The computerized wagering game system of claim 1, wherein the audio track is played by starting the audio track from a point based on a clock.

4. The computerized wagering game system of claim 1, wherein at least one of the different audio programs comprise a series of songs from similar genres.

5. The computerized wagering game system of claim 1, wherein the audio program is selected by use of electromechanical buttons on the wagering game machine.

6. The computerized wagering game system of claim 1, wherein the audio program is selected via a menu presented on the display of the wagering game machine.

7. The computerized wagering game system of claim 1, wherein the audio program is selected via a primary touchscreen display or a secondary touchscreen display.

8. The computerized wagering game system of claim 1, wherein at least one of the different audio programs are received from a server a via a network connection.

9. A method of operating a computerized wagering game machine, comprising:
   conducting a wagering game on which monetary value can be wagered by executing gaming code on a processor;
   simultaneously running multiple audio tracks of a plurality of audio programs wherein different audio tracks include different audio programs;
   receiving a selection of an audio program of the plurality of audio programs by a wagering game player;
   playing the selected audio program in a virtual radio module, the selected audio program presented to simulate a radio such that playing of the selected audio program may start from a point other than the beginning of an audio track corresponding to the selected audio program, wherein the audio programs are received from a server via a network connection; and
   muting audio tracks of the audio programs not part of the selected audio program.

10. The method of claim 9, wherein the audio track is played by starting the audio track from a random point in the audio track.

11. The method of claim 9, wherein the audio track is played by starting the audio track from a point based on a clock.

12. The method of claim 9, wherein at least one of the different audio programs comprise a series of songs from similar genres.

13. The method of claim 9, wherein the audio program is selected by use of electromechanical buttons on the wagering game machine.

14. The method of claim 9, wherein the audio program is selected via a menu presented on the display of the wagering game machine.

15. The method of claim 9, wherein the audio program is selected via a primary touchscreen display or a secondary touchscreen display.

16. The method of claim 9, wherein at least one of the plurality of different audio programs are received from a server a via a network connection.

17. A non-transitory machine readable medium with instructions stored thereon, the instructions when executed operable to cause a computerized system to:
   play a wagering game on which monetary value can be wagered by executing gaming code on a processor;
   simultaneously play multiple audio tracks of a plurality of audio programs wherein different audio tracks include different audio programs; and
   receive a selection, by a wagering game player, of an audio program of an audio program of the plurality of audio programs, the selected audio program presented to simulate a radio such that playing of the selected audio program may start from a point other than the beginning of an audio track corresponding to the selected audio program; and
   mute audio tracks of the audio programs not part of the selected audio program.

18. The non-transitory machine readable medium of claim 17, wherein the audio track is played by starting the audio track from a random point in the audio track.

19. The non-transitory machine readable medium of claim 17, wherein the audio track is played by starting the audio track from a point based on a clock.

20. The non-transitory machine readable medium of claim 17, wherein at least one of the different audio programs comprise a series of songs from similar genres.

21. The non-transitory machine readable medium of claim 17, wherein the audio program is selected by use of electromechanical buttons on the wagering game machine.

22. The non-transitory machine readable medium of claim 17, wherein the audio program is selected via a menu presented on the display of the wagering game machine.

23. The non-transitory machine readable medium of claim 17, wherein the audio program is selected via a primary touchscreen display or a secondary touchscreen display.

24. The non-transitory machine readable medium of claim 17, wherein at least one of the different audio programs are received from a server a via a network connection.

25. A computerized wagering game virtual radio system, comprising:
   a server having a network interface and configured to send multiple audio tracks of a plurality of audio programs to one or more computerized wagering games, wherein different audio tracks include different audio programs;
   a first computerized wagering game having a virtual radio audio module configured to play one of the audio programs of the plurality of audio programs selected by a first wagering game player, the selected audio program presented to simulate a radio such that playing of the selected audio program may start from a point other than the beginning of the audio track;
   a second computerized wagering game having a virtual radio audio module configured to play one of the audio programs selected by a second wagering game player; and
   synchronizing playback of audio programs between the first computerized wagering game and the second computerized wagering game when the first wagering game player and the second wagering game player select the same audio program.

* * * * *

UNITED STATES PATENT AND TRADEMARK OFFICE
CERTIFICATE OF CORRECTION

| | |
|---|---|
| PATENT NO. | : 8,162,752 B2 |
| APPLICATION NO. | : 11/575611 |
| DATED | : April 24, 2012 |
| INVENTOR(S) | : James Bonney et al. |

It is certified that error appears in the above-identified patent and that said Letters Patent is hereby corrected as shown below:

In column 5, line 23, in Claim 8, after "server" delete "a".

In column 5, line 61, in Claim 16, before "different" delete "plurality of".

In column 5, line 62, in Claim 16, after "server" delete "a".

In column 6, line 10, in Claim 17, after "program" delete "of an audio program".

In column 6, line 38, in Claim 24, after "server" delete "a".

Signed and Sealed this
Eleventh Day of September, 2012

David J. Kappos
*Director of the United States Patent and Trademark Office*